United States Patent
Alanqari et al.

(10) Patent No.: US 11,274,241 B2
(45) Date of Patent: Mar. 15, 2022

(54) ANTI-BIT BALLING ADDITIVE

(71) Applicant: SAUDI ARABIAN OIL COMPANY, Dhahran (SA)

(72) Inventors: Khawlah A. Alanqari, Dhahran (SA); Abdullah S. Al-Yami, Dhahran (SA); Nasser Salem Alalhareth, Dhahran (SA); Ali Mohammed Alsafran, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 0 days.

(21) Appl. No.: 16/894,376

(22) Filed: Jun. 5, 2020

(65) Prior Publication Data

US 2021/0380863 A1 Dec. 9, 2021

(51) Int. Cl.
| | |
|---|---|
| *C09K 8/24* | (2006.01) |
| *C09K 8/03* | (2006.01) |
| *C09K 8/035* | (2006.01) |
| *E21B 43/16* | (2006.01) |

(52) U.S. Cl.
CPC .............. *C09K 8/24* (2013.01); *C09K 8/032* (2013.01); *C09K 8/035* (2013.01); *E21B 43/162* (2013.01)

(58) Field of Classification Search
None
See application file for complete search history.

(56) References Cited

U.S. PATENT DOCUMENTS

| | | | |
|---|---|---|---|
| 4,549,607 A * | 10/1985 | Morita ................... | C09K 8/584 166/270.1 |
| 5,057,234 A | 10/1991 | Bland et al. | |
| 5,586,608 A | 12/1996 | Clark et al. | |
| 6,291,405 B1 | 9/2001 | Lee et al. | |
| 8,030,252 B2 * | 10/2011 | Shumway ................. | C09K 8/64 507/224 |
| 9,199,879 B2 * | 12/2015 | Thaemlitz ............... | C09K 8/032 |
| 9,574,126 B2 | 2/2017 | Gamble et al. | |
| 9,598,626 B2 | 3/2017 | Witham et al. | |
| 10,081,750 B2 | 9/2018 | Shroff Rama et al. | |
| 2007/0012447 A1 * | 1/2007 | Fang ........................ | C09K 8/44 166/291 |
| 2008/0207469 A1 | 8/2008 | Gregg | |
| 2010/0173804 A1 | 7/2010 | Van de Peer et al. | |
| 2010/0311619 A1 | 12/2010 | Mettath et al. | |
| 2012/0181025 A1 * | 7/2012 | Barnes .................... | C09K 8/584 166/279 |
| 2017/0137692 A1 | 5/2017 | Cliffe et al. | |
| 2018/0223160 A1 | 8/2018 | Al-Yami et al. | |
| 2019/0309210 A1 | 10/2019 | Al-Yami et al. | |

FOREIGN PATENT DOCUMENTS

| | | |
|---|---|---|
| CN | 103045209 A | 4/2013 |
| CN | 105086963 A | 11/2015 |
| CN | 105132004 A | 12/2015 |

OTHER PUBLICATIONS

International Search Report and Written Opinion issued in Application No. PCT/US2020/040986, dated Feb. 26, 2021 (13 pages).

* cited by examiner

*Primary Examiner* — John J Figueroa
(74) *Attorney, Agent, or Firm* — Osha Bergman Watanabe & Burton LLP

(57) ABSTRACT

Drilling fluid compositions and methods for using drilling fluid compositions are provided with enhanced anti-bit balling properties that includes an aqueous base fluid, one or more drilling fluid additives, and an anti-bit balling additive where the anti-bit balling additive comprises a $C_{15}$-$C_{18}$ alkene or a mixture of two or more $C_{15}$-$C_{18}$ alkenes. Methods for using the drilling fluid compositions may further include mixing the mixing an aqueous base fluid with one or more drilling fluid additives and an anti-bit balling additive, wherein the anti-bit balling additive includes a $C_{15}$-$C_{18}$ alkene or a mixture of two or more $C_{15}$-$C_{18}$ alkenes, and introducing the drilling fluid to a subterranean formation.

17 Claims, No Drawings

ANTI-BIT BALLING ADDITIVE

BACKGROUND

Bit balling refers to a buildup of cuttings from shale formations that may adhere to a drill bit. Drill "cuttings" are broken bits of solid materials produced as rock or soil is broken apart that must be continuously removed from the borehole during drilling. Bit balling may occur at almost any time and results in a reduction in the rate of penetration, reduced surface torque of the drill bit, and an increase in stand pipe pressure. As the clay or shale accumulates and bit balling increases, drilling will slow and eventually may need to be stopped in order for the drill bit to be cleaned before proceeding.

Conventional additives or coatings may be used to control bit balling tendencies; however, most additives require an oil phase in the drilling fluid or require an emulsified drilling fluid to be effective. The oil phase in the fluid may provide lubrication necessary for the additives to function. Some anti-bit balling additives also require a particular pH range and cloud point range to be compatible with the drilling fluids used. Additionally, the efficacy of conventional additives and coatings is lacking, often requiring the drill to be frequently removed and cleaned before drilling can proceed.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein relate to a drilling fluid compositions with enhanced anti-bit balling properties that includes an aqueous base fluid, one or more drilling fluid additives, and an anti-bit balling additive where the anti-bit balling additive comprises a $C_{15}$-$C_{18}$ alkene or a mixture of two or more $C_{15}$-$C_{18}$ alkenes.

In a further aspect, embodiments disclosed herein relate to methods for using a drilling fluid with enhanced anti-bit balling properties in drilling operations. The method may include mixing an aqueous base fluid with one or more drilling fluid additives and an anti-bit balling additive, where the anti-bit balling additive includes a $C_{15}$-$C_{18}$ alkene or a mixture of two or more $C_{15}$-$C_{18}$ alkenes and introducing the drilling fluid to a subterranean formation.

In another aspect, embodiments disclosed herein relate to drilling fluid compositions with enhanced anti-bit balling properties. The compositions may include an aqueous base fluid, one or more drilling fluid additives, a clay-based component, and an anti-bit balling additive, where the anti-bit balling additive includes a $C_{15}$-$C_{18}$ alkene or a mixture of two or more $C_{15}$-$C_{18}$ alkenes and at least one of dimethyl silicone polymer with silica and polypropylene glycol.

Other aspects and advantages of the claimed subject matter will be apparent from the following description and the appended claims.

DETAILED DESCRIPTION

Embodiments in accordance with the present disclosure generally relate to methods and compositions of an anti-bit balling additive for an anti-bit balling drilling fluid that may be used as a water based drilling fluid additive to reduce bit balling without the need to use a drilling fluid containing an oil phase or emulsified drilling fluid.

As a non-limiting example, the anti-bit balling drilling fluids of the present disclosure may be used in the oil and gas drilling industries, such as for drilling in oil and gas wells. Oil and gas wells may be formed in subterranean portions of the earth, sometimes referred to as subterranean geological formations. The wellbore may serve to connect natural resources, such as petrochemical products, to a ground level surface. In some embodiments, a wellbore may be formed in the geological formation, for instance, by a drilling procedure.

To drill a subterranean well or wellbore, a drill string including a drill bit and drill collars to weight the drill bit may be inserted into a predrilled hole and rotated to cut into the rock at the bottom of the hole, producing rock cuttings. Commonly, the drilling fluid, or "drilling mud," may be utilized during the drilling process. To remove the rock cuttings from the bottom of the wellbore, drilling fluid is pumped down through the drill string to the drill bit. The drilling fluid may cool and lubricate the drill bit and may provide hydrostatic pressure in the wellbore to provide support to the sidewalls of the wellbore and prevent the sidewalls from collapsing and caving in on the drill string and to prevent fluids in the downhole formations from flowing into the wellbore during drilling operations. The drilling fluid may also lift the rock cuttings away from the drill bit and upwards as the drilling fluid is recirculated back to the surface. The drilling fluid may transport rock cuttings from the drill bit to the surface, which can be referred to as "cleaning" the wellbore.

The rock or drill cuttings are broken bits of solid materials produced as rock or soil is broken apart that must be continuously removed from the borehole during drilling. The cuttings may vary based on the drilling application, and in some instances may include clay (shale), rock, or soil pieces. These pieces often begin to agglomerate, forming a dense slurry that may build up on the drill bit. The increasing use of water-based drilling fluids aggravates bit balling problems, as water from the drilling fluid may be absorbed by the cuttings, exacerbating their tendency to stick to the drill bit. Clay cuttings may be particularly susceptible to cause bit balling problems due to the plastic limit, or water content, of clay.

Clay may be classified based on the Attenberg limits, which differentiate three phases of clay-based on water content: the liquid limit, plastic limit, and plastic index. The liquid limit is the threshold moisture content at which the clay is so saturated with moisture that it begins to wash away in an almost-liquid form. Clay at its liquid limit is a muddy liquid that is easily washed from a drill bit. The plastic index of clay refers to the lowest moisture content at which the clay may be rolled into threads one eighth of an inch in diameter without breaking into pieces. This clay does not contain much moisture and is in an almost-solid form. Clay at its plastic index is easily brushed away from the drill bit as chalky residue, and is also not generally problematic. Finally, the plastic limit of clay refers to the state between the liquid limit and the plastic index, in which the clay contains enough water to impart stickiness to the clay without adding so much water that the clay forms a liquid. This plastic limit may also be referred to as the "danger zone" of the clay due to the problems caused by the thick nature and sticky texture of the clay. Clay at the plastic limit is often a viscous, gummy slurry that is very difficult to manipulate.

Anti-Bit Balling Additive

In one or more embodiments, the methods and compositions may include an anti-bit balling additive that includes or is composed of one or more $C_{15}$-$C_{18}$ alkenes. In some embodiments, the anti-bit balling additive may include the $C_{15}$-$C_{18}$ alkenes mixed with dimethyl silicon polymer with silica, and/or polypropylene glycol. The anti-bit balling additive may be added to the water based drilling fluid in an amount that ranges from 0.1 to 15% by weight. Embodiments comprising such an additive may reduce the tendency of bit balling by preventing and reducing the accumulation of cuttings and the adhesion of the cuttings to a drill bit.

Alkenes

The drilling fluid anti-bit balling additive of one or more of the present embodiments may contain components that impart anti-sticking properties to drilled cuttings, and wellbore drilled formations. The alkene component(s) incorporated in the drilling fluids herein as anti-bit balling additives may be selected from linear or branched $C_{15}$-$C_{18}$ alkenes and mixtures thereof. In some embodiments, a mixture of two or more $C_{15}$-$C_{18}$ alkenes may be used.

In one or more embodiments, the term "alkene" may refer to a linear or branched aliphatic olefins that have one or more carbon-carbon double bonds. Alkenes having only one, only two, only three, etc., such multiple bonds can be identified by use of the term "mono," "di," "tri," etc., within the name. For example, alkamonoenes, alkadienes, and alkatrienes refer to linear or branched acyclic hydrocarbon olefins having only one carbon-carbon double bond (acyclic having a general formula of $C_nH_{2n}$), only two carbon-carbon double bonds (acyclic having a general formula of $C_nH_{2n-2}$), and only three carbon-carbon double bonds (acyclic having a general formula of $C_nH_{2n-4}$), respectively. Alkenes can be further identified by the position of the carbon-carbon double bond(s).

In one or more embodiments of the present disclosure, the anti-bit balling additive may include $C_{15}$-$C_{18}$ alkenes having a structure of vinylidine ($RRCCH_2$), tetra-substituted alkenes ($RRC=CRR$), tri-substituted alkenes ($RHC=CRR$), cis/trans disubstituted alkenes (RCHCHR/R'CHCHR), and/or alpha olefin ($RCHCH_2$). In one or more embodiments R and R' may be an alkyl or alkyl chain or combination of alkyl chains of having 1 to 13 carbon atoms such that the resulting alkene is a $C_{15}$-$C_{18}$ alkene. R and R' may specifically denote the position of the R or R' group with respect to the double bond present in the olefin. Groups denoted with R may also vary in chain length in multi-substituted aliphatic olefins of one or more embodiments of the present disclosure. In one or more embodiments, the anti-bit balling additive may comprise the $C_{15}$-$C_{18}$ alkene component or blend in an amount that ranges from 50, 60, 65, 70, 75, and 80 wt % to 75, 80, 85, 90, 95, 99, 99.9, and 100 wt %, based on the entire weight of the anti-bit balling additive.

Polyalkylsiloxane

The drilling fluid anti-bit balling additive of one or more of the present embodiments may further contain components which provide additional anti-sticking properties to drilled cuttings and wellbore drilled formations. The additional components incorporated in the drilling fluid of embodiments herein may be selected from the group consisting of hydrocarbons such as polydimethylsiloxane and silica reaction products (hydrophobic silica). In one or more embodiments of the present disclosure, polyalkylsiloxanes may contain silica particles, the polyalkylsiloxanes containing silica particles may be blends of poly-dimethylsiloxanes and hydrophilic and/or hydrophobic silica. The polyalkylsiloxanes blends may have a minimum number average molecular weight of 1,100,000 amu. In one or more embodiments, the anti-bit balling additive may comprise the polyalkylsiloxane blend in an amount that ranges from 0, 0.1, 0.5, 1, 5, and 10 to 15, 20, 25, 30, 35, and 40 wt %, based on the entire weight of the anti-bit balling additive composition.

Glycol

The drilling fluid anti-bit balling additive of one or more of the present embodiments may further contain a glycol component. In one or more embodiments, the glycol component may be a polyethylene glycol or a polypropylene glycol. In one or more embodiments, the anti-bit balling additive may comprise the polypropylene glycol in an amount that ranges from 0, 0.1, 0.5, 1, 5, 10, 15, 20, and 25 to 15, 20, 25, 30, 35, and 40 wt %, based on the entire weight of the anti-bit balling additive composition, where any lower limit may be combined with any mathematically feasible upper limit. Polyethylene glycol may be used in similar amounts.

The anti-bit balling drilling fluid may alternatively or additionally contain polyalklyene glycols such as polypropylene glycol, which are macromolecules with a series of internal ether linkages. Polyalklyene glycols are capable of dissolving in water and have a greater impact on viscosity with greater molecular weight. The added polyalkylene glycol may be polypropylene glycol having Formula (II) where n may be 1 to 50:

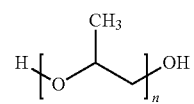

Formula (II):

In some embodiments, n may be varied to achieve the desired molecular weight of the polypropylene glycol produced. In some embodiments, n may be from 1, 3, 5, 10, 15, 20 and 25, to 10, 15, 20, 30, 35, 40, and 50. The polypropylene glycol may have a weight average molecular weight of from 100 grams per mol (g/mol) to 1500 g/mol, as measured according to gel permeation chromatography (GPC). In some embodiments, the polypropylene glycol may have a weight average molecular weight of from 100, 200, 250, 300, 350, 400, 450, 500, and 550 g/mol to 200, 300, 400, 500, 600, 800, 1,000, 1200, and 1500 g/mol, where any lower limit may be combined with any mathematically feasible upper limit. In some embodiments, the polypropylene glycol may have a weight average molecular weight of 200 g/mol, or 300 g/mol, or 400 g/mol, or 600 g/mol, or 1200 g/mol, or 1500 g/mol.

Without being bound by any particular theory, the polypropylene glycol may help to provide lubrication to the drill bit surface. The polypropylene glycol may lubricate the drill bit without requiring use of an oil phase in the drilling fluid or use of an emulsified drilling fluid. The adhesion of clay to the drill bit may be caused, at least in part, by electrochemical attraction of both the clay to the metal drill bit and, as the clay accumulates, clay to clay interactions. Moreover, the surface of the metal bit may be water-wet, and clay has molecular layers of water adsorbed on its surface. It is believed that the clay may adhere to bits and drill collars when forced into intimate contact by the force and weight of the drill string due to water molecules between the drill bit and the clay forming hydrogen bonds. The polypropylene glycol may act to reduce the surface tension, decreasing the accretion of cuttings to the bit surface. Furthermore, the polypropylene glycol is non-polar and may eliminate the polarity of the hydrogen bonding, reducing the adhesion of the clay to the bit surface.

Drilling Fluid

In one or more embodiments of the present disclosure, the anti-bit balling additive may be included in the drilling fluids in an amount that ranges from 0.1, 0.5, 1.0, 2.0, 3.0, 5.0 and 7.0 wt % to 5.0, 6.0, 7.0, 9.0, 11.0, 13.0 and 15.0 wt % by weight of the entire drilling fluid composition, wherein any lower limit may be combined with any mathematically feasible upper limit. The drilling fluid may contain from 0.01 lb/bbl to 5 lb/bbl of the anti-bit balling drilling fluid additive in some embodiments.

The drilling fluid may include water in addition to other drilling fluid additives. The water may be distilled water, deionized water, or tap water. In some embodiments, the water may contain additives or contaminants. For instance, the water may include freshwater or seawater, natural or synthetic brine, or salt water. In some embodiments, salt or other organic compounds may be incorporated into the water to control certain properties of the water, and thus the drilling fluid, such as density. Without being bound by any particular theory, increasing the saturation of water by increasing the salt concentration or the level of other organic compounds in the water may increase the density of the water, and thus, the drilling fluid. Suitable salts may include, but are not limited to, alkali metal chlorides, hydroxides, or carboxylates. In some embodiments, suitable salts may include sodium, calcium, cesium, zinc, aluminum, magnesium, potassium, strontium, silicon, lithium, chlorides, bromides, carbonates, iodides, chlorates, bromates, formates, nitrates, sulfates, phosphates, oxides, fluorides and combinations of these. Without being bound by any particular theory, brine may be used to create osmotic balance between the drilling fluid and the subterranean formation.

The drilling fluid may contain from 10 wt % to 95 wt % water based on the total weight of the drilling fluid. In one or more embodiments, the drilling fluid may comprise greater than 70 wt % water based on the total weight of the drilling fluid.

Without being bound by any particular theory, the water content may allow the drilling fluid to have proper flowability, ensuring that the clay-based material is not overly viscous, nor overly thin. In some embodiments, the drilling fluid may have about the density of water, which may allow for increased amounts of water in the drilling fluid. Similarly, in some embodiments, the drilling fluid may have a density that exceeds 150 pounds per cubic foot (lbs/ft$^3$).

In one or more embodiments, the drilling fluid may comprise one or more clay-based materials. In one or more embodiments the drilling fluid may comprise an a clay-based component that may be any clay-based material or mud suitable for use in drilling fluids, which may vary based on the application of use. In some embodiments, the clay-based component may contain, for instance, lime (CaO), $CaCO_3$, bentonite, montmorillonite clay, barium sulfate (barite), hematite ($Fe_2O_3$), mullite ($3Al_2O_3 \cdot 2SiO_2$ or $2Al_2O_3 \cdot SiO_2$), kaolin, ($Al_2Si_2O_5(OH)_4$ or kaolinite), alumina ($Al_2O_3$, or aluminum oxide), silicon carbide, tungsten carbide, and combinations thereof. In some embodiments, the clay-based component may be bentonite. Without being bound by any particular theory, use of a clay-based component may increase the viscosity and rheology of the drilling fluid to allow for better drill lubrication, shear strength, and transportation of cuttings.

The drilling fluid may contain from 0.01 wt % to 20 wt % of the clay-based component based on the total weight of the drilling fluid. In one or more embodiments, the drilling fluid may contain from 5, 7, 9, 10, 12, 14 and 15 wt % to 12, 14, 16, 17, 18, 19 and 20 wt % of the clay-based component based on the total weight of the drilling fluid, where any lower limit may be combined with any mathematically feasible upper limit.

In one or more embodiments, the drilling fluid may comprise one or more additional additives such as weighting agents, fluid loss control agents, lost circulation control agents, antifoaming agents, weighting agents, fluid loss additives, viscosity adjusters, an alkali reserve, specialty additives, and combinations of these. In some embodiments, however, the drilling fluid may include anti-bit balling additives according to embodiments herein without the need to add defoamers, as embodiments herein may result in stable drilling fluids that do not contain an oil phase or an emulsion.

One or more additives may be incorporated into the drilling fluid to enhance one or more characteristics of the drilling fluid. A viscosifier, also referred to as a rheology modifier, may be added to the drilling fluid to impart non-Newtonian fluid rheology to the drilling fluid to facilitate lifting and conveying rock cuttings to the surface of the wellbore. Examples of viscosifiers may include, but are not limited to polyacrylamide, polyanionic cellulose, or combinations of these. In some embodiments, the drilling fluid may include xanthan gum, a polysaccharide commonly referred to as XC polymer. The XC polymer may be added to the water-based drilling fluid to produce a flat velocity profile of the water-based drilling fluid in annular flow, which may help to improve the efficiency of the drilling fluid, in particular lower density drilling fluids, in lifting and conveying rock cuttings to the surface.

In one or more embodiments, the drilling fluid may have a pH ranging from 5, 5.5, 6, 6.5, 7, 7.5, 8, 8.5, 9, 9.5, and 10 to 6, 6.5, 7, 7.5, 8, 8.5, 9, 9.5, 10, 10.5 and 11, where any lower limit may be combined with any mathematically feasible upper limit.

In some embodiments, the drilling fluid may contain from 0.01 wt % to 20 wt % of the one or more additives, not including the clay-based component, based on the total weight of the drilling fluid. In one or more embodiments, the drilling fluid may contain from 0.1, 0.5, 1.0, 1.5, 2.0, 2.5 and 3.0 wt % to 2.0, 2.5, 3.0, 3.5, 4.0, 5 and 20 wt % of the clay-based component based on the total weight of the drilling fluid, where any lower limit may be combined with any mathematically feasible upper limit.

In some particular embodiments, the drilling fluid may include from 0.025 to 1 lb/bbl of the XC polymer. In embodiments, the drilling fluid may include from 0.025 to 10 lb/bbl starch.

In some embodiments, the one or more additives may include solids, sometimes referred to as weighting material, which may be dispersed in the drilling fluid. The solids may be finely divided solids having a high specific gravity (SG) that may be added to the drilling fluid to increase the density of the drilling fluid. Examples of weighting materials suitable for use as the solid may include, but are not limited to, barite (minimum SG of 4.20 grams per centimeter cubed (g/cm$^3$)), hematite (minimum SG of 5.05 g/cm$^3$), calcium carbonate (minimum SG of 2.7-2.8 g/cm$^3$), siderite (minimum SG of 3.8 g/cm$^3$), ilmenite (minimum SG of 4.6 g/cm$^3$), other weighting materials, or any combination of these weighting materials. In some embodiments, the drilling fluid may include barite as the solid.

The addition of solids may be used to control the density of the drilling fluid. In some embodiments, the drilling fluid may have a density of from 62 pounds of mass per cubic foot (pcf) to 170 pcf, as measured using Fann Model 140 Mud Balance according to ASTM Standard D4380. For instance, the drilling fluid may have a density of from 63 pcf to 150 pcf, from 65 pcf to 140 pcf, from 70 pcf to 160 pcf, from 80 pcf to 150 pcf, from 90 pcf to 140 pcf, from 100 pcf to 160 pcf, from 70 pcf to 150 pcf, or from 70 pcf to 100 pcf. The drilling fluid may have a density that is greater than or equal to 62 pcf, greater than or equal to 70 pcf, or greater than or equal to 100 pcf. In some embodiments, the drilling fluid may have a density of from 120 pcf to 160 pcf.

One or more embodiments of the present disclosure additionally relate to methods of producing an anti-bit balling drilling fluid. The produced drilling fluids may be in accordance with any of the embodiments previously described. The method may include mixing water, and an anti-bit balling additive, and one or more drilling fluid additives in accordance with any of the embodiments previously described.

In some embodiments, the mixture may be mixed at a shear speed of from 300 rotations per minute (RPM) to 11500 RPM, such as from 300 RPM to 600 RPM, or from 600 RPM to 900 RPM. The mixture may be sheared, such as at 10000 RPM for example, for from 10 minutes to 100 minutes, such as from 10 minutes to 15 minutes, or from 20 minutes to 40 minutes, or from 60 minutes to 80 minutes.

One or more embodiments of the present disclosure may also relate to method for using the drilling fluid in drilling operations. The drilling fluid may be in accordance with any of the embodiments previously described. In some embodiments, the drilling fluid may be introduced into a subterranean formation. Introducing may involve injecting the drilling fluid into the subterranean formation. In some embodiments, the drilling fluid may be injected through a drill string to a drill bit and recirculated to the surface. In some embodiments, the subterranean formation may be a well. The drilling fluid may at least be partially circulated within the subterranean formation. Recirculating the fluid may allow the drilling fluid to cool and lubricate the drill bit and to lift rock cuttings away from the drill bit, carrying the cuttings upwards to the surface to clean the drill bit and the wellbore. The drilling fluid may additionally provide hydrostatic pressure to support the sidewalls of the wellbore and prevent the sidewalls from collapsing onto the drill string.

As previously described, the drilling fluid of the present embodiments may reduce the tendency for bit-balling to occur on a drill bit. Bit-balling refers to the accumulation of cuttings on the drill bit, which slow and even stop the drill bit from properly performing. The tendency for cuttings to accumulate may be referred to as the accretion percentage, or the percentage of growth of the cuttings (or other components) to accumulate on the drill bit. In some particular applications, it may be desirable to maintain an accretion percentage of less than or equal to 20% to ensure optimal drilling conditions. In some embodiments, the drilling fluid of the present embodiments may produce an accretion percentage of less than or equal to 20%, such as less than or equal to 18%, less than or equal to 16%, such as less than or equal to 15%, less than or equal to 14%, less than or equal to 12%, less than or equal to 10%, or less than or equal to 5%.

Examples

The following examples are merely illustrative and should not be interpreted as limiting the scope of the present disclosure.

To demonstrate the advantages of the composition according to one or more embodiments disclosed herein, the following experiments were conducted to examine the effects of the compositions prepared in accordance with one or more embodiments of the present disclosure.

The anti-bit balling drilling fluids of the present disclosure may have improved anti-bit balling characteristics over conventional drilling fluids, which, in some embodiments, may be due in part to the anti-bit balling additive described in the embodiments detailed above.

The accretion properties of several samples were tested to compare drilling fluids of the present embodiments with conventional drilling fluids that did not contain the surfactant or the polyethylene glycol of the present disclosure. Five formulations were tested with one comparative examples and four examples that were prepared in accordance with the embodiments previously described. The composition of each formulation is listed in Table 1.

The compositions 1 through 5 were continuously mixed using a Hamilton Beach Model HMD 400 mixer at 11500 RPM shear.

TABLE 1

| | Mixing time (min) | CE #1 | #2 | #3 | #4 | #5 |
|---|---|---|---|---|---|---|
| water | 0 | 308 cc | 308 cc | 308 cc | 308 cc | 308 cc |
| Anti-bit balling reagent | 0 | 0 g | 2 g | 3 g | 4 g | 4 g |
| xc polymer | 15 | 0.75 g | 0.75 g | 0.75 g | 0.75 g | 0.75 g |
| PAC-R | 15 | 2 g | 2 g | 2 g | 2 g | 2 g |
| STARCH | 15 | 6 g | 6 g | 6 g | 6 g | 6 g |
| LIME | 10 | 2 g | 2 g | 2 g | 2 g | 2 g |
| CaCO3(fine) | 5 | 35 g | 35 g | 35 g | 35 g | 35 g |
| calibrated bentonite | 5 | 30 g | 30 g | 30 g | 30 g | 30 g |
| RevDust | 5 | 5 g | 5 g | 5 g | 5 g | 6 g |

To further demonstrate the results of the accretion tests, observations were recorded of both the accretion tube before and after the rod was hot rolled in the test cell with the drilling fluid.

The experiments were conducted by first measuring the weight of bare rod to the nearest gram and comparing the weight of the rod prior to hot rolling in the prepared fluid with the weight of the rod after it was removed from the hot rolling cell.

For each of the four formulations, the drilling fluid was prepared and a pre-weighed rod was added to the formulation. The drilling fluid and accretion tube were hot rolled at 150° F. for 4 hours in a hot rolling cell pressurized to 500 psi. The rod was then removed and set on a scale to be weighed.

The weight of the mud remaining on the rod was determined by subtracting the final weight from the initial weight of the dry rod. The resulting weight of the rods and accretion percentage are provided in Table 2 for further comparison.

Accretion tube results of Comparative Example (CE) #1 are provided to demonstrate the effectiveness of the anti-bit balling additive. Comparative Example 1 was a drilling fluid without an anti-bit balling additive. The dry accretion tube had a starting dry weight of 115.67 g, shown in Table 2. Comparative Example 1 was hot rolled in the tube for 4 hours, placed on a screen and was weighed at 136.36 g. Observation during the weighing period showed that the drilling fluid was clinging to the accretion tube and there was pooling observed at the bottom of the tube. Over 20 g of mud remained on the accretion tube.

Examples 2-5 are drilling fluid formulations utilizing an anti-bit balling additive in varying amounts as shown in Table 1. The anti-bit balling additive in each example was prepared to include 60 wt % $C_{15}$-$C_{18}$ alkenes mixed with 14 wt % diethyl silicon polymer, and 26 wt % of polypropylene glycol. The dry accretion tube of Example 2 had a starting dry weight of 115.67 g, shown in Table 2. Example 2 was hot rolled in the tube for 4 hours, placed on a screen, and then the accretion tube was weighed at 135.30 g. Observation of the accretion tube on the screen demonstrated that the drilling fluid of Example 2 was not clinging to the groves in the accretion tube and there was no pool at the bottom of the screen. About 18.2 g of mud remained on the accretion tube.

Additional observations were recorded regarding the accretion tube results of Examples 3-5 of the present disclosure. Examples 3-5 are also drilling fluid formulations utilizing an anti-bit balling additive, in varying amounts as provided in Table 1. The accretion tube results are shown in Table 2. Examples 3-5 further demonstrate that by increasing the amount of the anti-bit balling additive, a greater degree of accretion mitigation can be achieved. Examples 4 and 5 demonstrate that the formulations consistently result in reducing the amount of accretion experienced within the fluid.

TABLE 2

| FORMULATION NO: | Weight of the rod (DRY) | Weight of the rod (AHR TEST 4 HRS @ 150 F.) | Difference in weight (Mud remaining on tube) | Accretion Percentage |
|---|---|---|---|---|
| #1 | 115.665 | 136.36 | 20.695 | 17.89% |
| #2 | 115.665 | 135.3 | 19.545 | 16.89% |
| #3 | 115.665 | 135.2 | 19.635 | 16.97% |
| #4 | 115.665 | 131.1 | 15.435 | 13.34% |
| #5 | 115.665 | 130.5 | 14.835 | 12.82% |

Although the preceding description has been described herein with reference to particular means, materials and embodiments, it is not intended to be limited to the particulars disclosed herein; rather, it extends to all functionally equivalent structures, methods and uses, such as are within the scope of the appended claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112(f) for any limitations of any of the claims herein, except for those in which the claim expressly uses the words 'means for' together with an associated function.

What is claimed is:

1. A drilling fluid composition with enhanced anti-bit balling properties comprising:
    an aqueous base fluid;
    one or more drilling fluid additives; and
    an anti-bit balling additive, wherein the anti-bit balling additive comprises:
        a $C_{15}$-$C_{18}$ alkene or a mixture of two or more $C_{15}$-$C_{18}$ alkenes, and
        polydimethyl silicone polymer with silica in an amount ranging from 0.1 to 40 wt %.

2. The drilling fluid composition of claim 1, wherein the drilling fluid comprises a clay-based component.

3. The drilling fluid composition of claim 1, wherein the anti-bit balling additive further comprises one or more selected from the group consisting of a dimethyl silicon polymer with silica, polypropylene glycol, or a mixture thereof.

4. The drilling fluid composition of claim 1, wherein the anti-bit balling additive comprises the $C_{15}$-$C_{18}$ alkene in an amount ranging from 60 to 99.9 wt %.

5. The drilling fluid composition of claim 4, wherein the anti-bit balling additive comprises polypropylene glycol in an amount ranging from 0.1 to 40 wt %.

6. The drilling fluid composition of claim 1, wherein the one or more drilling fluid additives is one or more additives selected from the group consisting of weighting agents, fluid loss control agents, lost circulation control agents, antifoaming agents, supplemental weighting agents, fluid loss additives, viscosity adjusters, an alkali reserve, or a mixture thereof.

7. A method for using a drilling fluid with enhanced anti-bit balling properties in drilling operations, the method comprising:
    mixing an aqueous base fluid with one or more drilling fluid additives and an anti-bit balling additive, wherein the anti-bit balling additive comprises: a $C_{15}$-$C_{18}$ alkene or a mixture of two or more $C_{15}$-$C_{18}$ alkenes, and, polydimethyl silicone polymer with silica in an amount ranging from 0.1 to 40 wt %; and
    introducing the drilling fluid to a subterranean formation.

8. The method of claim 7, wherein the anti-bit balling additive comprises one or more selected from the group consisting of a dimethyl silicon polymer with silica, polypropylene glycol, or a mixture thereof.

9. The method of claim 7, wherein introducing the drilling fluid comprises injecting the drilling fluid and at least partially circulating the drilling fluid within the subterranean formation.

10. The method of claim 8, wherein the anti-bit balling additive comprises polypropylene glycol in an amount ranging from 0.1 to 40 wt %.

11. The method of claim 7, wherein the drilling fluid comprises a clay-based component selected from one or more of the group consisting of lime (CaO), $CaCO_3$, bentonite, montmorillonite clay, barium sulfate (barite), hematite ($Fe_2O_3$), mullite ($3Al_2O_3.2SiO_2$ or $2Al_2O_3.SiO_2$), kaolin, ($Al_2Si_2O_5(OH)_4$ or kaolinite), alumina ($Al_2O_3$, or aluminum oxide), silicon carbide, tungsten carbide, or a mixture thereof.

12. The method of claim 11, wherein the drilling fluid comprises the clay-based component in an amount ranging from 1 to 20 wt %.

13. A drilling fluid composition with enhanced anti-bit balling properties comprising:
- an aqueous base fluid;
- one or more drilling fluid additives;
- a clay-based component; and
- an anti-bit balling additive, wherein the anti-bit balling additive comprises (i) a $C_{15}$-$C_{18}$ alkene or a mixture of two or more $C_{15}$-$C_{18}$ alkenes, and (ii) at least one of dimethyl silicone polymer with silica and polypropylene glycol.

14. The drilling fluid composition of claim 13, wherein the drilling fluid comprises the clay-based component in an amount ranging from 1 to 20 wt %.

15. The drilling fluid composition of claim 13, wherein the anti-bit balling additive comprises the $C_{15}$-$C_{18}$ alkene in an amount ranging from 60 to 99 wt %.

16. The drilling fluid composition of claim 1, wherein the drilling fluid comprises the anti-bit balling additive in an amount ranging from 0.1 to 15 wt %.

17. The drilling fluid composition of claim 13, wherein the drilling fluid comprises greater than 70 wt % water.

\* \* \* \* \*